Patented Sept. 29, 1942

2,297,357

UNITED STATES PATENT OFFICE 2,297,357

METHOD FOR BRAZING HIGH CARBON STEEL

Floyd C. Kelley, Schenectady, N. Y., assignor to General Electric Company, a corporation of New York No Drawing. Application October 19, 1940, Serial No. 361,945

7 Claims. (Cl. 148—4)

The present invention relates to copper brazed steel and more particularly to a method for brazing steels containing a relatively high percentage of carbon, for example steels which contain 0.30% or more carbon. My prior application Serial No. 296,941, filed September 28, 1939, and entitled "Brazing structure and method of making the same," which issued Mar. 17, 1942, as U. S. Pat. No. 2,276,847, of which the present application is a continuation in part, discloses a method for brazing chrome steel in which the atmosphere employed in the brazing operation is pure, dry hydrogen capable of reducing $Cr_2O_3$. In my prior application there is also disclosed a method for brazing carbon steel which method comprises removing some of the surface carbon from the steel and then copper brazing it in pure, dry hydrogen. However, in copper brazing steel containing a relatively high percentage of carbon with my prior process it is necessary to remove considerable carbon from the steel so as to obtain a good brazed joint and as a result of this carbon removal the tensile strength of the steel is reduced.

It is one of the objects of the present invention to provide a method for copper brazing steel containing 0.30% or more carbon which does not impair the strength of the steel. It is a further object of the invention to provide between steel structures containing a high percentage of carbon, a brazed joint which is bound so tightly to the steel that it performs like the steel and whose physical characteristics, such as yield point, proportional limit, and tensile strength, etc. are substantially the same as that of the steel itself.

In carrying out my invention the steel parts or structures to be brazed preferably are ground to provide smooth, very flat surfaces which fit closely together. The surface of the steel is then decarburized in any suitable manner, for example by heating in wet hydrogen for about twenty minutes or longer at a temperature of about 1000° C. When the steel has been cooled to about 200° C. or thereafter heated to that temperature, a water solution of nickel nitrate $Ni(NO_3)_2$ is applied with a brush or other means to the surface to be brazed. At a temperature of about 200° C. the water in the solution will be driven off leaving a thin uniform coating of the salt on the steel. The steel parts to be brazed are then assembled with a thin sheet of copper about 0.002 inch thick between them. The assembled structures, which usually are bound together with wire so as to be held in alignment, are placed in a substantially closed container which in turn is positioned in a hydrogen furnace. The furnace is heated to a temperature of about 1350° C. and the structures to be brazed are maintained in the furnace for about 15 minutes. At the end of about 12 minutes the temperature of the steel will be about 1165° C. and above the melting point of the copper. During the brazing operation pure dry hydrogen capable of reducing $Cr_2O_3$ is supplied to the substantially closed container in which the steel to be brazed is positioned.

When the brazing operation is completed the brazed steel is moved into the cooling chamber of the furnace and permitted to cool therein to room temperature. The resulting brazed junction is very thin, for example about 0.0008 inch thick. When the brazed steel is a commercial 0.35% carbon steel the junction has a tensile strength of 76,400 pounds per square inch and a proportional limit of 41,900, whereas the steel itself after the above heat treatment has a tensile strength of 104,900 pounds per square inch and a proportional limit of 34,000.

In cooling the brazed steel in the cooling chamber of the furnace certain strains are developed. These strains may be removed and the grain structure of the steel refined by a normalizing treatment which comprises heating the brazed steel to a temperature about 50 to 75° C. above the critical temperature of the steel after which it is air cooled to room temperature. In the normalizing operation the brazed steel is introduced into a furnace which, in the case of the 0.35% carbon steel, is heated at a temperature of about 900° C. The brazed steel is brought up to that temperature and held at that temperature for about 15 minutes. As a result of the normalizing treatment the 0.35% carbon steel has a tensile strength of about 96,400 pounds per square inch, a yield point of 58,900, and a proportional limit of 58,400, whereas the brazed junction has a tensile strength of about 90,400 pounds per square inch, a yield point of 57,700, and a proportional limit of 57,400, the latter properties being substantially identical with the physical properties of the steel itself.

If a harder steel is desired, or one which has somewhat different characteristics, it may be obtained by a further heat treatment of the brazed steel. For example 0.35% carbon steel may be heated for about one hour at a temperature of about 830° C. which is slightly above the critical temperature of the steel. The steel is quenched from that temperature, preferably in a water soluble oil and then drawn at a temperature of about 600° C. for about two hours. As a result of this treatment, which may be designated a stabilizing heat treatment, the steel itself will have a tensile strength of 107,200 pounds per square inch and a proportional limit of 72,900, whereas the brazed joint will have a tensile strength of 66,700 pounds per square inch and a proportional limit of 66,400. The time and temperature of the draw may vary and will depend upon the characteristics desired in the brazed product. For example, heating brazed steel containing about 0.35% carbon at 600° C. for two hours gives desirable results while heating for a longer period of time has a tendency to reduce the hardness of the steel. The tensile strength of the copper brazed 0.35% carbon steel when quenched drastically, is usually reduced as compared with unbrazed steel which has had a similar treatment. The shear stresses on the brazed joint resulting from the severe quench are responsible for the drop in tensile strength. There are, however, alloy carbon steels which have lower critical cooling rates which might be used where these shear stresses could be lowered due to the fact that a drastic quench is not required for their heat treatment. In such cases the tensile strength of the brazed joint would more closely approximate that of the steel itself.

For brevity and simplicity, I have given only a comparison between the properties of commercial 0.35% carbon steel and the brazed junction between such steel which have been treated in accordance with my process. However similar improved results may be obtained with any carbon steel or alloy carbon steel containing 0.30% or more carbon.

The action of the nickel nitrate in the brazing operation may be complex but apparently it breaks down within the critical oxidation range of iron, for example 175 to 450° C. and furnishes oxygen to oxidize the surface of the steel. This oxidized surface when reduced provides a satisfactory surface for copper brazing. Nickel oxide, which apparently is also formed during the brazing operation is reduced very rapidly in hydrogen at temperatures as low as 200° C. This reduction leaves finely divided nickel powder widely distributed over the steel surface thereby furnishing capillary attraction for the brazing copper causing it to spread uniformly over the surface of the steel.

The hydrogen supplied to the proposed container in which the structures to be brazed are positioned is purified to such an extent that it will reduce $Cr_2O_3$. The water vapor is removed so completely from the hydrogen that when it is passed through liquid air no ice will form. To produce hydrogen of this degree of purity, it is first passed through a tube filled with copper wire or shavings heated to a temperature of about 600° C. The hydrogen is then passed over $P_2O_5$ in the second tube. These successive operations of passing the hydrogen through the heated copper and over $P_2O_5$ are repeated several times. The pure hydrogen emerging from the last tube containing $P_2O_5$ will not contain a trace of oxygen or water vapor.

What I claim as new and desire to secure by Letters Patent of the United States, is:

1. The method for copper brazing steel containing at least 0.30% carbon which comprises removing carbon from the surface of the steel, coating said surface with a solution of nickel nitrate, removing the water from said coating, applying a thin layer of copper to the steel and heating the assembled copper and steel in a hydrogen atmosphere capable of reducing $Cr_2O_3$ for a period of time and at a temperature sufficiently high to effect the brazing operation.

2. The method for copper brazing steel structures containing at least 0.30% carbon which comprises removing carbon from the surface of the steel structures to be brazed, coating said surfaces with a solution of nickel nitrate, removing the water from said coatings, applying a thin layer of copper between the structures to be brazed and heating the assembled structures in hydrogen capable of reducing $Cr_2O_3$ for a period of time and at a temperature sufficiently high to effect the brazing operation.

3. The method for copper brazing steel structures containing at least 0.30% carbon which comprises removing carbon from the surface of the steel structures to be brazed, applying a solution of nickel nitrate to said surfaces, removing the water from the coated surfaces, placing a thin layer of copper between the structures to be brazed and heating the assembled structures in hydrogen capable of reducing $Cr_2O_3$ and for a period of time and at a temperature sufficiently high to effect the brazing operation, cooling the brazed structure and thereafter normalizing it at a temperature of about 50 to 75° above the critical temperature of the steel.

4. The method for copper brazing steel structures containing at least 0.30% carbon which comprises removing carbon from the surface of the steel structures to be brazed, applying a solution of nickel nitrate to said surfaces, removing the water from the coated surfaces, placing a thin layer of copper between the structures to be brazed, heating the assembled structures in hydrogen capable of reducing $Cr_2O_3$ and for a period of time and at a temperature sufficiently high to effect the brazing operation, cooling the brazed structure, thereafter normalizing it at a temperature of about 50 to 75° above the critical temperature of the steel, thereafter heating the steel at a temperature of about 830° C., quenching and then drawing it at a temperature of about 600° C.

5. The method for copper brazing steel containing at least 0.30% carbon which comprises removing carbon from the surface of the steel, coating said surface with a solution of nickel nitrate, removing the water from said coating, applying a thin layer of copper to the steel and heating the assembled copper and steel for several minutes in a hydrogen atmosphere capable of reducing $Cr_2O_3$ and at a temperature high enough to melt the copper and effect the brazing operation.

6. The method for copper brazing steel containing at least 0.30% carbon which comprises removing carbon from the surface of the steel, coating said surface with a solution of nickel nitrate, removing the water from said coating, applying a thin layer of copper to the steel and heating the assembled copper and steel for about fifteen minutes in a furnace having a hydrogen atmosphere capable of reducing $Cr_2O_3$ and a temperature in the neighborhood of 1350° C.

7. The method of brazing steel structures containing at least 0.30% carbon which comprises removing carbon from the steel structures to be brazed, coating said surface with a solution of nickel nitrate, removing the water from said coatings, applying a thin layer of copper between the structures to be brazed and heating the assembled structures for several minutes in a furnace having a temperature in the neighborhood of 1350° C. and a hydrogen atmosphere capable of reducing $Cr_2O_3$ to thereby effect the brazing operation.

FLOYD C. KELLEY.